(12) United States Patent
Flaherty et al.

(10) Patent No.: US 12,522,551 B2
(45) Date of Patent: Jan. 13, 2026

(54) PROCESSES FOR PRODUCING AN ETHER

(71) Applicants: Dow Global Technologies LLC, Midland, MI (US); The Board of Trustees of the University of Illinois, Urbana, IL (US)

(72) Inventors: David W. Flaherty, Urbana, IL (US); David G. Barton, Midland, MI (US); Xue Chen, Manvel, TX (US); Claudia Eugenia Berdugo-diaz, Urbana, IL (US); Jing Luo, Midland, MI (US); Yangsik Yun, Champaign, IL (US)

(73) Assignees: Dow Global Technologies LLC, Midland, MI (US); Board of Trustees of the University of Illinois, Urbana, IL (US)

( * ) Notice: Subject to any disclaimer, the term of this patent is extended or adjusted under 35 U.S.C. 154(b) by 381 days.

(21) Appl. No.: 18/043,827

(22) PCT Filed: Oct. 4, 2021

(86) PCT No.: PCT/US2021/053350
§ 371 (c)(1),
(2) Date: Mar. 2, 2023

(87) PCT Pub. No.: WO2022/093489
PCT Pub. Date: May 5, 2022

(65) Prior Publication Data
US 2023/0265032 A1    Aug. 24, 2023

Related U.S. Application Data

(60) Provisional application No. 63/107,739, filed on Oct. 30, 2020.

(51) Int. Cl.
| | | |
|---|---|---|
| *C07C 41/01* | (2006.01) | |
| *B01J 21/04* | (2006.01) | |
| *B01J 23/63* | (2006.01) | |
| *B01J 23/648* | (2006.01) | |
| *B01J 23/652* | (2006.01) | |
| *B01J 37/02* | (2006.01) | |

(52) U.S. Cl.
CPC .............. *C07C 41/01* (2013.01); *B01J 21/04* (2013.01); *B01J 23/63* (2013.01); *B01J 23/6484* (2013.01); *B01J 23/6527* (2013.01); *B01J 37/0201* (2013.01); *C07C 2523/42* (2013.01); *C07C 2523/44* (2013.01); *C07C 2523/648* (2013.01); *C07C 2523/652* (2013.01); *C07C 2523/755* (2013.01); *C07C 2523/847* (2013.01); *C07C 2523/888* (2013.01)

(58) Field of Classification Search
CPC .............................................. C07C 41/01–09
See application file for complete search history.

(56) References Cited

U.S. PATENT DOCUMENTS

| | | |
|---|---|---|
| 3,370,067 A | 2/1968 | Johnson |
| 3,894,054 A | 7/1975 | Miya |
| 4,973,717 A | 11/1990 | Williams |
| 8,912,365 B2 | 12/2014 | Lemaire et al. |

FOREIGN PATENT DOCUMENTS

| | | | | |
|---|---|---|---|---|
| CN | 1485322 A | * | 3/2004 | |
| CN | 109160871 A | * | 1/2019 | ........... C07C 29/149 |

OTHER PUBLICATIONS

Machine translation CN109160871A, Jan. 8, 2019; pp. 1-10 (Year: 2019).*
Machine translation CN1485322A, Mar. 31, 2004, pp. 1-13 (Year: 2004).*
Kumar, V. V. et al. "Influence of W on the reduction behaviour and Brønsted acidity of Ni/TiO2catalyst in the hydrogenation of levulinic acid to valeric acid: Pyridine adsorbed Drifts study" Applied Catalysis A: General 531 (2017) 169-176 (Year: 2017).*
Avaev, "Effect of the Nature of the Carrier and Reduction Conditions on the Properties of Rhenium Catalysts of Hydrogenation of Ethyl Acetate", Russian Chemical Bulletin, 1988, vol. 37, No. 1, pp. 15-19.
Baxter, "New Conversions of Esters to Ethers and Its Application to the Preparation of Furano-18-crown-6", J. Org. Chem., 1981, vol. 46, pp. 831-832.
Gnanamani, "Deuterium kinetic isotopic study for hydrogenolysis of ethyl butyrate", Journal of Catalysts, 2011, vol. 277, No. 1, pp. 27-35.
Hart, "An efficient method for the reductive conversion of acyclic esters to ethers via a TMS-protected acetal", Tetrahedron Letters, 2017, vol. 58, pp. 3024-3027.
Minachev, "Hydrogenation of Ethyl Acetate on Re/Y-A1203 Catalyst", Russian Chemical Bulletin, 1986, vol. 35, pp. 280-283.
Sakai, "An Efficient One-Pot Synthesis of Unsymmetrical Ethers: A Directly Reductive Deoxygenation of Esteres Using an InBr3/Et3SiH Catalytic System", J. Org. Chem., 2007, vol. 72, No. 15, pp. 5920-5922.
Studer, "Catalytic hydrogenation of chiral alpha-amino and alpha-hydroxy esters at room temperature with nishimura catalyst without racemization", Advanced Synthesis and Catalysis, 2001, vol. 343, No. 8, pp. 802-808.
Butter, "1-0-Alkyl (di)glycerol ethers synthesis from methyl esters and triglycerides by two pathways: catalytic reductive alkylation and transesterification/reduction", Green Chem., 2013, vol. 15, pp. 786-797.
Sutter, "Selective Synthesis of 1-0-Alkyl(poly)glycerol Ethers by Catalytic Reductive Alkylation of Carboxylic Acids with a Recyclable Catalytic System", ChemSusChem, 2012, vol. 5, No. 12, pp. 2397-2409.
PCT/US2021/053350 International Search Report and Written Opinion with a mailing date of Jan. 21, 2022.

* cited by examiner

Primary Examiner — Medhanit W Bahta
(74) Attorney, Agent, or Firm — Arthur R. Rogers

(57) ABSTRACT

A process for producing an ether including treating (a) an ester with (b) hydrogen in the presence of (c) a heterogeneous catalyst to reduce the ester by hydrogenation to form an ether product.

8 Claims, No Drawings

PROCESSES FOR PRODUCING AN ETHER

FIELD

The present invention relates to processes for producing an ether compound; and more specifically, the present invention relates to processes for producing an ether compound directly from an alkyl ester using molecular hydrogen on a heterogeneous catalyst.

BACKGROUND

Ethers are used in various applications as a solvent. Ethers are particularly desirable for use as a solvent in applications because ethers possess excellent solvency, chemical stability and compatibility with other organic solvents and formulated products. Known routes of synthesizing ethers include the following three routes: (1) alkyl halides treated with alkoxides (so called the "Williamson ether synthesis"); (2) alcohol addition to an olefin; and (3) acid catalyzed coupling of alcohols. However, the above three routes have undesirable limitations including: (1) use of strongly acidic or basic conditions which can lead to competing elimination reactions that produce undesired olefins; (2) limited options of bio-sourced raw materials due to lack of reactivity with the above reactions which limit the structural variety of products; and (3) use of toxic raw materials and generation of waste streams in a manufacturing process. Therefore, what is desired is to provide a viable route for producing an ether that can be successfully scaled up commercially without the limitations of the above known routes.

For example, heretofore the known methods for producing an ether include the following: (1) a process using metal hydride/Lewis acid complexes, or hydrosilanes as stoichiometric hydride donors with precious metal catalysts as disclosed in J. Org. Chem., 2007, 72, 5920-5922; Tetrahedron Letters, 2017, 58, 3024-3027; (2) a process for producing a thionate (a salt or ester of thionic acid) such as a thioether (a sulfide which is a bonded compound of sulfur and two organic residues) as disclosed in J. Org. Chem., 1981, 46, 831-832; (3) a process for the catalytic reduction of α-monoglycerides with a 5 percent (%) Pd/C catalyst mixed with an acid cocatalyst at about 700 psi (4.8 megapascals [MPa]) and 120 degrees Celsius (° C.) as disclosed in U.S. Pat. No. 8,912,365; (4) a non-direct process for the hydrogenation of ethyl acetate into ethanol intermediates that subsequently couple to form a symmetrical ether by-product on Re/(γ-$Al_2O_3$) or Re/(θ-$Al_2O_3$) at up to 4.6% conversion and 57% selectivity as disclosed in Russian Chemical Bulletin 1988, 37(1), 15-19 and Russian Chemical Bulletin 1986, 35, 280-283; (5) a process for the hydrogenation of lactone to cyclic ethers, for example (e.g.), for production of tetrahydrofuran, in high selectivities such as greater than (>) 90% using various metal catalysts on various support carriers as disclosed in U.S. Pat. Nos. 3,370,067; 3,894,054; and 4,973,717; and (6) a process using homogeneous metal complex catalysts (e.g. a ruthenium/triphos complex) which require impractical separation of catalyst from product. Angewandte Chemie, International Edition, 2015, 54, 5196-5200; ChemSusChem, 2016, 9, 1442-1448. It would be desirable to have alternative processes for producing ethers that can be commercially manufactured and that provide advantages over existing processes.

SUMMARY

The present invention is directed to processes for producing an ether product from an ester starting raw material.

In a broad embodiment, a process of the present invention includes producing an ether by hydrogenation of an ester in the presence of a heterogeneous catalyst.

In one embodiment, a process of the present invention includes direct selective reduction of carboxylic acid derivatives into ethers using molecular hydrogen and a proper catalyst formulation for achieving a high (e.g., >5%) absolute ether selectivity with a high (e.g., >85%) direct ether selectivity. Absolute ether selectivity is the percentage of the total products formed in the reaction, while the direct ether product selectivity is the percentage of direct ether product over the total ether products.

In another embodiment, a process of the present invention for producing an ether comprises mixing: (a) at least one ester with (b) hydrogen in the presence of (c) a heterogeneous catalyst to reduce the ester by hydrogenation to form an ether.

In still another embodiment, the present invention includes a solvent comprising the above ether product produced by the above process.

Some of the advantageous features that can be provided by one or more embodiments of the process of the present invention include, for example:

(1) An active catalyst is used in a one-step process. The catalyst is active for direct hydrogenation of an ester to reduce the ester to form an ether, rather than going through a known two-step ether formation process such as (i) ester hydrogenolysis to form alcohol followed by (ii) alcohol dehydration.

(2) A relatively inexpensive route is used. The process employs inexpensive molecular hydrogen as a reduction agent, rather than employing expensive hydrosilanes, metal hydrides, or metal hydride/Lewis acid complexes as a hydride donor. The highly reactive hydrosilanes or metal hydride employed in prior art processes also requires the design of a complicated and expensive process to ensure the safety of the operators running the prior art processes.

(3) A heterogeneous catalyst is used. The catalyst being heterogeneous rather than homogeneous, can contribute to lower manufacturing costs due to catalyst recyclability.

(4) An efficient process is used.

(5) A flexible process is used. The process is applicable to a general ester compound (either cyclic or acyclic) as a feed material; and the process is not limited to a specified ester compound.

DETAILED DESCRIPTION

In one embodiment, the present invention includes a distinct and novel method for synthesizing ethers from esters with heterogeneous catalysts. The reactions of ester include various chemical reaction routes or pathways, for example, hydrogenolysis, hydrolysis, dehydration, hydrogenation, and transesterification. In a general embodiment, the process of the present invention includes producing an ether by hydrogenation of an ester, such as a propyl acetate, in the presence of a heterogeneous catalyst. The present invention's novel hydrogenation reaction pathway or scheme, for example, the hydrogenation of propyl acetate reduction reaction scheme with $R_1$ being —$CH_3$ and $R_2$ being —$CH_2CH_3$, is generally illustrated as Reaction Scheme (I) as follows:

Reaction Scheme (I)

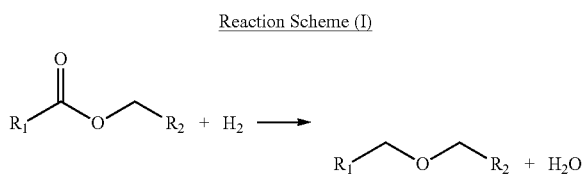

In the above Reaction Scheme (I), water is generated by the reduction process; and the generated water can be separated by conventional processes such as distillation or other procedures known in the art. Functional groups $R_1$, $R_2$ can be alkyl functional groups including straight or branched-chain alkyl groups, cyclic or non-cyclic alkyl groups; and mixtures thereof. Examples of the esters herein include but are not limited to ethyl acetate, propyl acetate, butyl acetate, ethyl propionate, butyl propionate and mixtures thereof. The desired ether product resulting from the above Reaction Scheme (I) can be a symmetric ether when $R_1$ is equivalent to $R_2$; or an unsymmetric ether when $R_1$ is not equivalent to $R_2$, for example, the unsymmetric ether can be ethyl propyl ether.

A "symmetric ether" herein means an ether that contains two identical functional groups, wherein $R_1$ is equal to $R_2$. An "unsymmetric ether" herein means an ether that contains two different functional groups, where $R_1$ is not equal to $R_2$.

In the present invention the desired reaction scheme, Reaction Scheme (I), is a direct hydrogenation route to obtain the desired ether product. By "direct hydrogenation" it is meant that carbonyl oxygen is removed from ester ($R_1COOCH_2R_2$) by hydrogenation to form ether ($R_1CH_2OCH_2R_2$) while maintaining the alkoxyl group intact. The present invention process is different from known processes because the present invention process does not undergo a typical route for ester ($R_1COOCH_2R_2$) hydrogenation, where ester first breaks into two alcohol ($R_1CH_2OH$+ $R_2CH_2OH$ molecules via hydrogenolysis and then subsequently forms a mixture of ethers ($R_1CH_2OCH_2R_1$+ $R_1CH_2OCH_2R_2$+$R_2CH_2OCH_2R_2$) via dehydration. Direct hydrogenation can maintain the structure of the ether from ester by only eliminating the carbonyl oxygen. Thus, an unsymmetric ester provided to this process advantageously results in the direct production of an unsymmetric ether because this process does not break the ester into two alcohol molecules via hydrogenolysis. The selectivity of ethyl propyl ether in the reaction examples are listed in Table III and Table V described below in the Examples.

The term "direct ether product" herein means an ether that is formed by a one-step reduction process of ether from ester.

The term "indirect ether product" herein means an ether that is formed by a two-step reduction process of ether from ester including the steps of: (i) hydrogenolysis and (ii) dehydration.

The term "direct ether product selectivity" herein means the percentage of the direct ether product (e.g., ethyl propyl ether) over the total ether products (e.g., ethyl propyl ether+ dipropyl ether+diethyl ether).

The term "ether product absolute selectivity" herein means the percentage of the ether product in the total products formed in the reaction (e.g., ethers, alcohols, and alkanes).

Advantageously, one unique factor of the present invention includes an increase in direct ether selectivity using the one-step process of the present invention versus the known two-step process.

In one embodiment, a process of the present invention for producing an ether comprises treating (a) an ester with (b) hydrogen in the presence of (c) a heterogeneous catalyst to reduce the ester by hydrogenation to form an ether.

In one desirable embodiment and as shown in Reaction Scheme (I) above, a process of the present invention for producing an ether comprises the steps of: (A) feeding into a reactor, an ester compound, component (a), such as propyl acetate; (B) feeding into the reactor, hydrogen, component (b), to form a hydrogen atmosphere in the reactor; and (C) charging the reactor with a heterogeneous catalyst system, component (c), such as a combination of a transition metal on an acidic support; sufficient to generate a hydrogenation reaction in the reactor; and (D) heating the contents of the reactor, components (a)-(c), at a temperature sufficient to reduce the ester compound to form an ether compound. For example, the heating, step (D), can take place at a temperature of from 350 Kelvin (K) to 650 K.

In some embodiments, the catalytic system of the present invention is, for example, a combination of a transition metal and an acidic support. For instance, the catalyst used in some embodiments of the present invention can include from 0.1 weight percent (wt %) to 20 wt % of a transition metal supported on an acidic support member. The synergistic effect from both the transition metal component and the acidic support component promotes the direct ether reduction route, as described in the reaction pathway Reaction Scheme (I). Without the combination of a transition metal and an acidic support member as disclosed herein, an undesirable two-step ether formation route would take place. Steady-state rates and product selectivity for competing reaction pathways for a model ester compound are obtained in, for example, a packed-bed reactor and/or a trickle bed reactor as functions of reactant pressures, temperature, and ester conversion, which are controlled via the surface residence time.

The ester compound, component (a), to be reduced to an ether, can include one or more ester compounds, including, for example, a carboxylic acid derivative; an ester containing straight or branched-chain alkyl groups, and cyclic or non-cyclic alkyl groups; and mixtures thereof. In some embodiments, an unsymmetric ether includes a Reaction Scheme (I) wherein the $R_1$ groups are not equal to the $R_2$ groups. In some embodiments, the ester useful in the present invention can be, for example, ethyl acetate (available from Sigma-Aldrich); propyl acetate (available from Sigma-Aldrich); pentyl acetate (available from Sigma-Aldrich); γ-butyrolactone, butyl butyrate (available from Sigma-Aldrich); and mixtures thereof.

The concentration of the ester, component (a), is not particularly critical. However, it may be advantageous, in some embodiments, for the ester to be present in an amount of at least 1 wt % so as to provide a desirable production rate and/or avoid an increase in separation costs. In some embodiments, the concentration of the ester is from 1 wt % to 100 wt %. The concentration of the ester is based on the total weight of ester compounds in the liquid feed raw material.

The concentration of the hydrogen, component (b), useful in the process of the present invention includes, for example, from 3 wt % to 100 wt % in one embodiment, from 10 wt % to 100 wt % in another embodiment, and from 50 wt % to 100 wt % in still another embodiment. Hydrogen with a low concentration of, for example less than (<) 3 wt % may decrease the reactivities or ether selectivities; and therefore, in such a case an undesirable increase of the reaction pressure would be required. The concentration of the hydrogen is based on the total weight of hydrogen in the gas feed raw material.

In a broad embodiment, the catalyst used in the process, component (c), of the present invention, can include one or more heterogeneous catalyst compounds. The catalysts used in the present invention process include, for example, a combination of (ci) a transition metal, supported on (cii) an acidic support (carrier) member. For example, the transition metal (component (ci)) may include palladium (Pd); platinum (Pt); nickel (Ni); ruthenium (Ru); cobalt (Co); rhodium (Rh) and mixtures thereof. The acidic support carrier member (component (cii)) may include, for example, a niobium oxide ($Nb_2O_5$) carrier; a tungsten oxide ($WO_3$) carrier; and mixtures thereof. In one preferred embodiment, the heterogeneous catalyst useful in the present invention can be Pd supported on a $Nb_2O_5$ support; Pd supported on a $WO_3$ support; and mixtures thereof.

The heterogeneous catalyst of the present invention exhibits some advantageous properties. For example, the heterogeneous catalysts useful in the present invention provide a synergistic effect between the metallic compound (e.g., Pd or Pt) of the catalyst and the Lewis acidity and/or Brønsted acidity from the carriers (e.g., $Nb_2O_5$) of the catalyst in order to catalyze direct ester hydrogenation. Otherwise, ether selectivities may decrease.

The heterogeneous catalyst, component (c), includes, for example, from 0.01 wt % to 20 wt % of the metallic compound based on the total weight of the heterogeneous catalyst in one embodiment, from 0.1 wt % to 20 wt % of the metallic compound based on the total weight of the heterogeneous catalyst in another embodiment, and from 1 wt % to 20 wt % of the metallic compound based on the total weight of the heterogeneous catalyst in still another embodiment.

The process equipment used to carry out the reduction process can be any conventional reactor such as a packed-bed reactor or a trickle bed reactor. And, the ester conversion and ether selectivities can be controlled via the reactor pressure, temperature, and surface residence time.

For example, the pressure of the process of the present invention is from 0.1 MPa to 10 MPa in one embodiment, from 2 MPa to 6 MPa in another embodiment, and from 6 MPa to 10 MPa in still another embodiment. Below the aforementioned pressure range may lead to lower reactivities or lower ether selectivities than disclosed herein. A pressure higher than the aforementioned pressure range may be sufficient to use in the present invention; however, it may require a higher cost in reactor construction and operation.

For example, the temperature of the process of the present invention is from 350 K to 650 K in one embodiment, from 400 K to 500 K in another embodiment, and from 500 K to 650 K in still another embodiment. Below the aforementioned temperature range may lead to lower reactivities than disclosed herein. A temperature higher than the aforementioned temperature range may lead to unwanted alkane and alcohol by-products; and therefore, in such a case the selectivities of the ether may decrease.

For example, the ester conversion of the process of the present invention is from 1% to 70% in one embodiment, from 1% to 50% in another embodiment, and from 15% to 50% in still another embodiment. In some embodiments, ester conversions higher than the aforementioned conversion range may lead to side reaction products.

The process of the present invention may be carried out as a batch process or a continuous process. When using a batch process, in some embodiments, the residence time of the process of the present invention is, for example, from 0.1 hour (hr) to 24 hr in one embodiment, from 0.1 hr to 8 hr in another embodiment, and from 1 hr to 24 hr in still another embodiment. In some embodiments, residence times below the aforementioned residence time range may lead to a lower ester conversion; and in some embodiments, residence times above the aforementioned residence time range may lead to unwanted side reaction products.

When using a continuous process, in some embodiments, the residence time of the process of the present invention is, for example, from 0.1 second (s) to 100 s in one embodiment, from 1 s to 10 s in another embodiment, and from 10 s to 100 s in still another embodiment. Residence times below the aforementioned residence time range may lead to a lower ester conversion; and in some embodiments, residence times above the aforementioned residence time range may lead to unwanted side reaction products.

Some advantageous properties and/or benefits of using the reduction process of the present invention include, for example, the process of the present invention can achieve steady-state rates; and the process can provide better selectivities of product for competing reaction pathways for an ester compound. Also, conventional processes for producing an ether also produces salt whereas the process of the present invention does not generate salt.

After an ester compound undergoes the reduction process, the resulting ether product is formed. The turnover rate of ester to the ether product can be from $10^{-8}$ moles of ether per gram catalyst per second ($mol/g_{cat} \cdot s$) to $10^{-5}$ $mol/g_{cat} \cdot s$ in one general embodiment, from $5 \times 10^{-8}$ $mol/g_{cat} \cdot s$ to $5 \times 10^{-6}$ $mol/g_{cat} \cdot s$. Ester turnover rates below the aforementioned rate range may lead to a lower ether production rate; and in some embodiments, ester turnover rate above the aforementioned residence time range may lead to unwanted side reaction products.

The selectivity of the ether product can depend on whether a vapor process or liquid process is used to form the ether and whether a batch process or continuous process is used. In general, the selectivity of the ether product is >5% in one embodiment, from 5% to 16% in another embodiment, and from 5% to 8% in still another embodiment.

While the ether product produced by the process of the present invention can be a symmetric ether or an unsymmetric ether, as an illustration of the present invention and not to be limited thereby, the present invention process is described with reference to an unsymmetric ether. It has been surprisingly discovered that the process of the present invention is selective for unsymmetric ether because in the present invention process the ester is directly converted to ether, without undergoing ester hydrogenolysis and alcohol dehydration. Ester hydrogenolysis and alcohol dehydration are two processes that are known to not be selective for a specific ether.

If an unsymmetric ether is needed for a specific process or end use, then use of the present invention process is more advantageous than conventional processes because:

(1) An ether product is more stable than the corresponding ester product under basic and acid conditions. Also, the ether products of the present invention do not undergo hydrolysis which can occur at high humidity and/or high temperatures.

(2) The hydrogen reaction chemistry of the present invention process maintains the backbone of the ester product intact. During the hydrogenation, only the oxygen molecule is broken away from the backbone and leaves the carbon molecules and backbone oxygen intact. In conventional reaction processes, the reaction breaks the back backbone and combines parts back together under different reaction conditions. Thus, no direct hydrogenation/reduction of the ester to an ether occurs.

(3) The process of the present invention, minimizes undesirable side reactions that may detrimentally affect the selectivities of the desired ether product.

The ether product of the present invention has a minimal impact on the environment, since the ether product is derived from organic and renewable sources. For example, the ether product advantageously can be used as a global green and bio-based solvent to address the stringent regulations imposed on chemical-based industrial solvents in relation to toxicity, non-biodegradability, volatile organic compound (VOC) emissions, and the like. Green and bio-based solvents are typically used in paints and coatings applications. Other applications include adhesives, pharmaceuticals, and printing inks. In some embodiments, the ether product can be used as a foam control agent and a flavor additive. In other embodiments, the ether product can be used in cosmetics and personal care applications.

The present invention provides biobased solvents at a cost and performance advantage to known solvents in the industry. In addition, the chemical transformation provided by the present invention process could be useful in product process to produce, for example, bio-based surfactants, defoamers and lubricants with both an economically and environmentally favorable process.

The ether generation process of the present invention can also be used to develop: (1) a more robust capping process to overcome the issues of limited reactant alkyl chloride types and final product impurities; (2) new capped low viscosity-low volatility lubricants; and (3) new surfactants and new biobased defoamers for food and pharmacy applications, metalworking fluids applications, and other applications utilizing an ether solvent.

EXAMPLES

The following Inventive Examples (Inv. Ex.) and Comparative Examples (Comp. Ex.) (collectively, "the Examples") are presented herein to further illustrate the present invention in detail but are not to be construed as limiting the scope of the claims. Unless otherwise stated all parts and percentages are by weight.

Catalysts

The catalyst ("Cat.") formulations used in the Examples are described in Table I and Table II. The Examples using Cat. 1-Cat. 18 which follow, were tested in a vapor-phase reactor, while the Examples using Cat. 19-Cat. 34 were tested in a liquid phase reactor.

The Examples using Cat. 1-Cat. 5 and Cat. 19-Cat. 22 are representative Inventive Examples (Inv. Ex.) of the present invention, while the Examples using Cat. 6-Cat. 18 and Cat. 23-Cat. 34 are Comparative Examples (Comp. Ex.). The formulations of the Inv. Ex. include: Pd as a transitional metal and $Nb_2O_5$ or $WO_3$ as a catalyst carrier. The Pd weight loading on the catalysts useful in the present invention is from 0.1 wt % to 5 wt %.

The process of the present invention includes a process that: (1) uses molecular hydrogen ($H_2$) as a reducing agent; (2) is conducted in vapor phase or liquid phase without additional solvents; and (3) uses a heterogeneous catalyst for ester reduction to ether, where the heterogeneous catalyst is a transitional metal, for example a Pd-based catalyst, and where the catalyst support (carrier) is an acid support, for example, a $WO_3$-based catalyst carrier or a $Nb_2O_5$-based catalyst carrier.

TABLE I

Catalyst Formulations Used in Vapor Phase Process

| Catalyst No. | Metal | Precursor | Support | Metal Weight (wt %) |
|---|---|---|---|---|
| Cat. 1 | Pd | $Pd(NO_3)_2\ 2H_2O$ | $Nb_2O_5$ | 0.8 |
| Cat. 2 | Pd | $Pd(NO_3)_2\ 2H_2O$ | $Nb_2O_5$ | 4.3 |
| Cat. 3 | Pd | $Pd(NO_3)_2\ 2H_2O$ | $WO_3$; 60 nm | 1 |
| Cat. 4 | Pd | $Pd(NO_3)_2\ 2H_2O$ | $Al_2O_3$ | 1 |
| Cat. 5 | Pd | $Pd(NO_3)_2\ 2H_2O$ | $Al_2O_3$ | 5 |
| Cat. 6 | Pd | $Pd(NO_3)_2\ 2H_2O$ | $TiO_2$ | 1 |
| Cat. 7 | Pd | $Pd(NO_3)_2\ 2H_2O$ | 10% $CeO_2$—90% $Al_2O_3$ 0.93 PV | 1 |
| Cat. 8 | Pd | $Pd(NO_3)_2\ 2H_2O$ | Silica stabilized tetragonal zirconia | 1 |
| Cat. 9 | Pd | — | C | 1 |
| Cat. 10 | Pt | $[Pt(NH_3)_4](NO_3)_2$ | $Nb_2O_5$ | 1 |
| Cat. 11 | Ni | $Ni(NO_3)_2\ 6H_2O$ | $Nb_2O_5$ | 0.58 |
| Cat. 12 | Ru | $RuCl_3\cdot xH_2O$ | $Nb_2O_5$ | 1 |
| Cat. 13 | Co | $Co(NO_3)_2\cdot 6H_2O$ | $Nb_2O_5$ | 1 |
| Cat. 14 | Rh | $Rh(NO_3)_3\cdot xH_2O$ | $Nb_2O_5$ | 1 |
| Cat. 15 | Fe | $Fe(NO_3)_3\cdot 9H_2O$ | $Nb_2O_5$ | 1 |
| Cat. 16 | Mn | $Mn(NO_3)_2\cdot xH_2O$ | $Nb_2O_5$ | 1 |
| Cat. 17 | Re | $HReO_4$ | $\gamma$-$Al_2O_3$ | 0.5 |
| Cat. 18 | Re | $NH_4ReO_4$ | $\gamma$-$Al_2O_3$ | 1 |
| Cat. 19 | Re | $NH_4ReO_4$ | $\gamma$-$Al_2O_3$ | 0.45 |
| Cat. 20 | Re | $NH_4ReO_4$ | 10% $CeO_2$—90% $Al_2O_3$ 0.93 PV | 1 |
| Cat. 21 | Re | $NH_4ReO_4$ | $Al_2O_3$—MgO 90:10 | 1 |
| Cat. 22 | Re | $SiO_2$ | $SiO_2$ | 1 |
| Cat. 23 | Re | $NH_4ReO_4$ | $TiO_2$ | 1 |

TABLE II

Catalyst Formulations Used in Liquid Phase Process

| Catalyst No. | Metal | Precursor | Support | Metal Weight (wt %) |
|---|---|---|---|---|
| Cat. 24 | Pd | $Pd(NO_3)_2\ 2H_2O$ | $Nb_2O_5$ | 1 |
| Cat. 25 | Pd | $Pd(NO_3)_2\ 2H_2O$ | $Nb_2O_5$ | 5 |
| Cat. 26 | Pd | $Pd(NO_3)_2\ 2H_2O$ | $WO_3$; 60 nm | 1 |
| Cat. 27 | Pd | $Pd(NO_3)_2\ 2H_2O$ | $WO_3$; 60 nm | 5 |
| Cat. 28 | Pd | $Pd(NO_3)_2\ 2H_2O$ | C | 1 |
| Cat. 29 | Pd | $Pd(NO_3)_2\ 2H_2O$ | $\gamma$-$Al_2O_3$ | 1 |
| Cat. 30 | Pd | $Pd(NO_3)_2\ 2H_2O$ | $\gamma$-$Al_2O_3$ | 5 |
| Cat. 31 | Pd | $Pd(NO_3)_2\ 2H_2O$ | $MoO_3$; 13-80 nm | 1 |
| Cat. 32 | Pd | $Pd(NO_3)_2\ 2H_2O$ | $CeO_2$ | 1 |
| Cat. 33 | Pd | $Pd(NO_3)_2\ 2H_2O$ | $ZrO_2$ | 1 |
| Cat. 34 | Pd | $Pd(NO_3)_2\ 2H_2O$ | $SiO_2$ | 1 |
| Cat. 35 | Pd | $Pd(NO_3)_2\ 2H_2O$ | $TiO_2$ | 1 |
| Cat. 36 | Ni | $Ni(NO_3)_2\ 6H_2O$ | $WO_3$; 60 nm | 1 |
| Cat. 37 | Ni | $Ni(NO_3)_2\cdot 6H_2O$ | $Nb_2O_5$ | 5 |
| Cat. 38 | Ru | $RuCl_3\cdot xH_2O$ | $Nb_2O_5$ | 1 |
| Cat. 39 | Pt | $[Pt(NH_3)_4](NO_3)_2$ | $WO_3$; 60 nm | 1 |

General Procedure for Synthesis of Supported Catalysts

The heterogeneous catalyst of the present invention can be prepared by introducing the transition metal catalyst onto the catalyst carrier by conventional methods such as impregnation, precipitation, coprecipitation, impregnation of colloidal metal nanoparticles, strong electrostatic adsorption, ion-exchange, mechanical mixing and the like. To prepare the heterogeneous catalysts for use in the Examples, transition metal particles were deposited onto supports using an incipient wetness impregnation method described as follows:

A calculated amount of metal precursors was dissolved in deionized water with an equivalent volume of the support pore volume to form a solution. The solution was added dropwise to the support achieving incipient wetness. The wet solids derived from incipient wetness impregnation were dried in stagnant air over 12 hr. Subsequently, the dried solids were calcined at 573-973 K for 3-4 hr in flowing air. The resulting calcined solids were then reduced at 673 K for 4 hr in flowing hydrogen/helium ($H_2$/He). The resulting catalyst sample was cooled to ambient temperature (about 25° C. [about 298 K]) and then the catalyst sample was passivated in a flowing mixture of air/He before the samples were exposed to ambient air. See Tables I and II above for metal loading, catalyst support and precursors used for each of the catalysts prepared for use in the Examples.

Test Measurements

Part A: Catalytic Rate Measurements in Vapor-Phase Reactor

Cat. 1-Cat. 23 were tested in a vapor-phase reactor. The vapor-phase reactor is a tubular packed bed reactor held within a stainless-steel tube (9.5 millimeters [mm] outer diameter [O.D.]) containing from 10 milligrams (mg) to 500 mg of catalyst. The catalyst was held at the center of the reactor using glass rods and packed glass wool. The tubular reactor was placed within a three-zone furnace (available from Applied Test Systems, 3210) that was controlled by an electronic temperature controller (available from Watlow, EZ-Zone). The catalyst temperature was measured by a K-type thermocouple contained within a 1.6 mm stainless-steel sheath (available from Omega) that was coaxially aligned within the reactor and submerged within the catalyst bed. The volume of the catalyst bed was kept constant at 1.4 cubic centimeters ($cm^3$) of material by mixing excess silicon carbide (SiC) (available from Washington Mills, Carborex green 36) with the desired amount of catalyst. The system was pressurized using a back-pressure regulator (BPR, an Equilibar LF Series available from Equilibar Precision Pressure Control) which was controlled by an electronic pressure regulator (EPR, an Equilibar GP1 available from Equilibar Precision Pressure). The reactor pressure was monitored upstream and downstream of the catalyst bed using a digital pressure gauge (available from Omega) and the EPR, respectively.

The gases used in the Examples were: $H_2$ (available from Airgas Inc. as "Ultra High Purity 5.0") and He (available from Airgas Inc. as "Ultra High Purity 5.0"). The gas flow rates were controlled using mass flow controllers (available from Bronkhorst as "EL-FLOW High Pressure"). The flow rate of liquid propyl acetate ($C_5H_{10}O_2$, supplied by Sigma Aldrich, 537438, at greater than or equal to [≥] 99.5%) was controlled using a stainless-steel syringe pump with a Hastelloy cylinder (100 DX with D-series controller, available from Teledyne Isco) as the $C_5H_{10}O_2$ was fed through a polyetheretherketone (PEEK) polymer tube (1.6 mm O.D. and 0.25 mm inner diameter [I.D.]) the exit of which was positioned within a small bed of non-porous sand ($SiO_2$ 50-70 mesh particle size, supplied by Sigma Aldrich, 274739) within a cross flow of $H_2$. The transfer lines surrounding the liquid inlet were kept at 373 K using heating tape (available from Omega) to avoid condensation. All transfer lines downstream of the liquid inlet were heated above 373 K using heating tape; and the line temperatures were monitored with K-type thermocouples (available from Omega) displayed on a digital reader (available from Omega).

Catalyst was pretreated in situ by heating the catalyst to the desired temperature at 0.05 Kelvin per second ($K\ s^{-1}$) and holding the catalyst at that temperature for the desired time within 101 kilopascals (kPa) flowing $H_2$ at 100 cubic centimeters per minute ($cm^3\ min^{-1}$) prior to all catalytic measurements. The effluent of the reactor was characterized using on-line gas chromatography (HP 6890, available from Agilent). The gas chromatograph (GC) was equipped with a capillary column (DB-624 UI, 30 meters (m) length, 0.25 mm I.D., 1.40 micron [μm]) connected to a flame ionization detector to quantify the concentrations of combustible species. Sensitivity factors and retention times for all components were determined using gaseous and liquid standards. Control of the reactor pressure and temperature, reactant flowrates, and the GC sampling were automated to allow for continuous measurements. Conversions were calculated on a carbon basis based on the amount of carbon that appears in the products. The carbon and oxygen balance closes within ±20%. Reactor conditions during rate and selectivity measurements were varied by sequentially decreasing and then increasing the reactant pressure over the full range of 1 MPa to 10 MPa such that one or more of the conditions is measured at least twice throughout the experiment to ensure that measured trends were not a result of systematic deactivation.

Part B: Catalytic Rate Measurements in Liquid-Phase Reactor

Cat. 24-Cat. 39 were tested in a liquid-phase reactor. Rate and selectivity measurements were performed in a trickle bed reactor comprising a stainless-steel tube (1.6 mm OD) containing 1,000 mg to 4,000 mg of catalyst (30 mesh to 60 mesh), which was held at the center of the reactor using Pyrex glass rods and packed glass wool. The reactor was heated with an aluminum clamshell including two heat cartridges that was controlled by an electronic temperature controller (an EZ-Zone available from Watlow). The reaction temperature was measured by a K-type thermocouple contained within a 3.2 mm stainless-steel sheath (available from Omega) that was coaxially aligned within the reactor and submerged within the aluminum clamshell. The system was pressurized up to 6.5 MPa using a dome loaded back pressure regulator (BPR), an Equilibar LF Series, available from Equilibar Precision Pressure Control which was controlled by an electronic pressure regulator (EPR), an Equilibar GP1 available from Equilibar Precision Pressure Control. The reactor pressure was monitored using a digital pressure gauge (available from Omega) and the EPR.

The gas flow rates of $H_2$ (available from Airgas); and He (available from Airgas); were controlled using mass flow controllers (EL-FLOW High Pressure controllers available from Bronkhorst). The flow rate of liquid propyl acetate ($C_5H_{10}O_2$) supplied by Sigma Aldrich, 537438, at ≥99.5%, was controlled using a high performance liquid chromatography (HPLC) pump (P-LST40B available from Chromtech) as the $C_5H_{10}O_2$ fed through a stainless-steel tube (1.6 mm O.D. and 0.15 mm I.D.) within a cross flow of $H_2$ and He.

Catalysts were pretreated in situ by heating to 503 K at 0.08 $K\ s^{-1}$ and holding for 1 hr within flowing He (20 kPa) and $H_2$ (81 kPa) at 50 $cm^3\ min^{-1}$ prior to all catalytic measurements. The effluent of the reactor passed through a stainless-steel cooling chamber including cold water (at a temperature of ~377 K), and then gas and liquid products were separated in a gas-liquid separator (GLS). The liquid products collected in the GLS were delivered by an HPLC pump to a high-pressure liquid sampling valve (LSV, Transcendent Enterprise Inc., PLIS-6890, 1 μL of injection volume) which is attached to on-line gas chromatography (Agilent, HP 7890B). At outlet of LSV, manual BPR (Swagelok) was installed so that the pressure of the liquid was maintained at 1,380 kPa to prevent the products from evaporation in the sampling system. The gas and liquid products were characterized using on-line gas chromatography (Agilent, HP 7890B). The GC was equipped with two capillary columns (DB-Wax UI, 60 m length, 0.25 mm I.D., 0.25 μm) for liquid product, and a GS-GASPRO (a GC column, 60 m length, 0.32 mm I.D., available from Agilent) was connected to a flame ionization detector to quantify the concentrations of species. Sensitivity factors and retention times for all gas products and liquid products were determined using gaseous standards and a methanizer (Polyarc System, PA-SYC-411, available from Activated Research Company), respectively. Control of the reaction pressure and temperature, reactant and product flowrates, and the GC samplings were automated to allow for continuous measurements. Conversions were calculated on a carbon basis based on the amount of carbon that appears in the products. The carbon balance closes within ±10%.

Test Results

Reaction Pathway Using Propyl Acetate as the Ester Starting Compound

A kinetic investigation of the catalysts (Cat. 1-Cat. 39) used in the Examples for the direct selective reduction of propyl acetate (an example of a representative ester) with molecular hydrogen was carried out to determine the reaction pathway for converting propyl acetate to an ether. There are several products observed in the product stream coming out of fixed bed reactor via GC analysis. The various products include, for example, light hydrocarbons such C2-C3 alkane alkene, ethanol, propanol, dipropyl ether, ethyl propyl ether, acetic acid, and ethyl acetate. Based on this observation, it can be concluded that the reaction took place via several routes in the reactor including for example: (1) hydrogenolysis of propyl acetate to one ethanol and one propanol; (2) hydrolysis of propyl acetate, to from propanol, and acetic acid; (3) the alcohols can then undergo dehydration to form light hydrocarbons, as well as dehydration to form ether products, like dipropyl ether, and ethyl propyl ether; (4) transesterification of propyl acetate with ethanol to form ethyl acetate and propanol; and (5) the route of the present invention, Reaction Scheme (I), i.e., direct hydrogenation of propyl acetate with hydrogen to form ethyl propyl ether. Since the desired product is the ethyl propyl ether via direct hydrogenation of propyl acetate, the route of Reaction Scheme (I) of the present invention is the desired reaction pathway. It should be noted that ethyl propyl ether could also be formed from the above route (3). However, the route (3) above is not desired since route (3) above includes alcohol dehydration reactions, and such alcohol dehydration reactions are not selective for the formation of unsymmetric ether over symmetric ethers such as dipropyl ether or diethyl ether. While the present invention process is not limited to producing either a symmetric ether or an unsymmetric ether; advantageously, the present invention process, selectively and in a direct pathway, provides an unsymmetric ether when desired or needed.

Part A: Vapor-Phase Ester Reduction Results

Examples 1-5 and Comparative Examples A-M

In Inv. Ex. 1-5 and Comp. Ex. A-R, the ether selectivity results using Cat. 1-Cat. 23 are described in Table III. The hydrogenation was carried out under the following reaction conditions: at a temperature range of 433 K to 504 K, at a $H_2$ pressure of 6.2 MPa, and at an ester pressure of 10 kPa. In Inv. Ex. 2., Inv. Ex. 5, and Comp. Ex. L-R, the catalysts were diluted with a carrier powder. The purpose of dilution using carrier powder was to lower the ester conversion to under 10%.

TABLE III

Vapor-Phase Ester Reduction Selectivities

| Example No. | Cat. No. | Dilution | Amount Loaded (mg) | T (K) | Conversion (%) | Absolute Selectivity (% Ethyl Propyl Ether) | Absolute Selectivity (% Dipropyl Ether) | Direct Ether Selectivity (%) |
|---|---|---|---|---|---|---|---|---|
| Inv. Ex. 1 | 1 | — | 24.11 | 503 | 32.7 | 8.5 | 0.1 | 98.8 |
| Inv. Ex. 2 | 2 | 1:5 with $Nb_2O_5$ | 31.35 | 503 | 1.3 | 5 | 0.08 | 98.4 |
| Inv. Ex. 3 | 3 | — | 39.52 | 503 | 32.4 | 13.6 | 0.5 | 96.5 |
| Inv. Ex. 4 | 4 | — | 27.15 | 503 | 4.8 | 7.5 | 0.5 | 93.8 |
| Inv. Ex. 5 | 5 | 1:5 with boehmite | 28.33 | 503 | 2.7 | 6.5 | 0.4 | 94.2 |
| Comp. Ex. A | 6 | — | 26.23 | 503 | 3.89 | 0.64 | 0 | 100.0 |
| Comp. Ex. B | 7 | — | 22.34 | 503 | 3.9 | 3.3 | 6.2 | 34.7 |
| Comp. Ex. C | 8 | — | 23.83 | 503 | 3.4 | 0.6 | 0.1 | 85.7 |
| Comp. Ex. D | 9 | — | 30.68 | 503 | 3.7 | 0 | 0 | 0 |
| Comp. Ex. E | 10 | — | 28.86 | 503 | 17.1 | 2.5 | 0.05 | 98.0 |
| Comp. Ex. F | 11 | — | 36.46 | 503 | 1.3 | 2.9 | 0.02 | 99.3 |
| Comp. Ex. G | 12 | — | 32.50 | 468 | 12 | 1.4 | 0 | 100.0 |
| Comp. Ex. H | 13 | — | 26.26 | 504 | 5 | 0.8 | 0.04 | 95.2 |
| Comp. Ex. I | 14 | — | 35.76 | 433 | 9.8 | 2.8 | 0.02 | 99.3 |
| Comp. Ex. J | 15 | — | 25.30 | 504 | 6.6 | 0 | 0.02 | 0 |
| Comp. Ex. K | 16 | — | 26.33 | 504 | 0.9 | 0 | 0.03 | 0 |
| Comp. Ex. L | 17 | 1:10 with $\gamma$-$Al_2O_3$ | 157.83 | 503 | 4.4 | 1.8 | 18.9 | 8.7 |
| Comp. Ex. M | 18 | 1:10 with $\gamma$-$Al_2O_3$ | 53.41 | 503 | 4.5 | 4.1 | 18.2 | 18.4 |
| Comp. Ex. N | 19 | 1:10 with $\gamma$-$Al_2O_3$ | 55.05 | 503 | 2.3 | 1.9 | 17.8 | 9.6 |
| Comp. Ex. O | 20 | 1:20 with 10% $CeO_2$-90% $Al_2O_3$ 0.93 PV | 58.92 | 503 | 4.2 | 3.2 | 14.4 | 18.2 |

TABLE III-continued

Vapor-Phase Ester Reduction Selectivities

| Example No. | Cat. No. | Dilution | Amount Loaded (mg) | T (K) | Conversion (%) | Absolute Selectivity (% Ethyl Propyl Ether) | Absolute Selectivity (% Dipropyl Ether) | Direct Ether Selectivity (%) |
|---|---|---|---|---|---|---|---|---|
| Comp. Ex. P | 21 | 1:20 with Al$_2$O$_3$-MgO 90:10 | 62.48 | 503 | 1.3 | 0 | 0.8 | 0.0 |
| Comp. Ex. Q | 22 | 1:20 with SiO$_2$ | 61.05 | 503 | 9.7 | 0.1 | 0.01 | 90.9 |
| Comp. Ex. R | 23 | 1:20 with TiO$_2$ | 67.06 | 503 | 4.5 | 0 | 0.1 | 0.0 |

In Inv. Ex. 1, propyl acetate reduction was conducted in the vapor phase reactor using 0.8 wt % Pd/Nb$_2$O$_5$ catalyst (Cat. 1). The absolute ethyl propyl ether selectivity was 8.5%, and the absolute dipropyl ether selectivity was 0.1%. The direct ether selectivity for ethyl propyl ether was 98.8%.

In support of Inv. Ex. 1, the selectivity for the ether product of the present invention was measured at various ester feed rates as described in Table IV. The reactions were carried over at a low conversion range of 1% to 48%, in order to demonstrate the reaction pathways. Table IV describes the conversion percentages of converting an ester to an ether product and the selectivities percentages of direct selective reduction of the ester to the desired ether product over a catalyst comprising 0.8 wt % Pd supported on Nb$_2$O$_5$, in the vapor phase reactor. As aforementioned in Inv. Ex. 1, the selectivities are based on the function of conversion at the following conditions: 10 kPa C$_5$H$_{10}$O$_2$, 6.2 MPa H$_2$, and 503 K.

TABLE IV

Conversion and Product Selectivities

| Feed Rate (mol C$_5$H$_8$O$_2$)(g$_{cat}$ s)$^{-1}$ | Conversion (%) | Absolute Selectivity (% Ethyl Propyl Ether) | Direct Ether Selectivity* (%) |
|---|---|---|---|
| 2.02E−05 | 1.04 | 4.40 | 98.2 |
| 1.51E−05 | 1.34 | 4.33 | 98.4 |
| 1.21E−05 | 1.67 | 3.97 | 96.6 |
| 1.01E−05 | 1.91 | 3.75 | 95.7 |
| 3.75E−06 | 7.70 | 4.63 | 97.7 |
| 2.81E−06 | 9.66 | 4.47 | 98.0 |
| 2.24E−06 | 10.63 | 4.39 | 97.8 |
| 1.88E−06 | 11.97 | 4.30 | 97.7 |
| 6.74E−07 | 32.66 | 8.53 | 98.5 |
| 5.06E−07 | 39.35 | 8.12 | 98.2 |
| 4.03E−07 | 43.79 | 7.79 | 97.7 |
| 3.39E−07 | 47.80 | 7.53 | 97.3 |

Notes for Table IV:
*Amount of ether produced directly from the ester relative to the total amount of ethers. In Table IV, for example, "Direct Ether Selectivity" = Absolute Selectivity of Ethyl Propyl Ether/(Ethyl Propyl Ether + Dipropyl Ether)* 100.

In Inv. Ex. 2, Cat. 2 contains 4.3 wt % Pd metal on Nb$_2$O$_5$ carrier. The absolute ethyl propyl ether selectivity was ~5%, and the absolute dipropyl ether selectivity was <0.1%. The direct ethyl propyl ether selectivity was 98.4%. The results in this Inv. Ex. 2 was similar to Inv. Ex. 1 which contained a lower Pd loading of 0.8 wt %.

In Inv. Ex. 3, Cat. 3 was prepared on WO$_3$. The ester conversion in this Inv. Ex. 3 was significantly higher than the catalyst on Nb$_2$O$_5$(Cat. 1 and Cat. 2) with almost the same metal loading. Absolute ethyl propyl ether selectivity was 13.6% and the absolute dipropyl ether selectivity was 0.5%. The direct ethyl propyl ether selectivity was 96.5%. The results indicate that the ethyl propyl ether was formed primarily from the direct route of Reaction Scheme (I).

In Inv. Ex. 4 and 5, boehmite was used as the catalyst carrier for Cat. 4 and Cat. 5, respectively. In Inv. Ex. 4 and 5, the absolute ethyl propyl ether selectivities reached a level of 7.5% and 6.5%, respectively; and the direct ether selectivity of ethyl propyl ether was 93.8% and 94.2% respectively.

In Comp. Ex. A-Comp. Ex. D, various oxide carriers were used, such as TiO$_2$, CeO$_2$, ZrO$_2$ and active carbon. None of the TiO$_2$, CeO$_2$, ZrO$_2$ and active carbon carriers (Cat. 6-Cat. 9) show an improvement in ethyl propyl ether selectivities. In Comp. Ex. E-Comp. Ex. K, various metallic components were used, such as Pt, Ni, Ru, Co, Rh, Fe, Mn, on N$_2$O$_5$ carrier (Cat. 10-16). The conversion using Pt (Cat. 10) was up to 17.1% with a 2.5% absolute ethyl propyl ether selectivity and a 98.0% direct ethyl propyl ether selectivity. The conversion using Ni (Cat. 11) was up to 1.3% with a 2.9% absolute ethyl propyl ether selectivity and a 99.3% direct ethyl propyl ether selectivity. The conversion using Ru (Cat. 12) was up to 12% with a 1.4% absolute ethyl propyl ether selectivity and a 100% direct ethyl propyl ether selectivity. The conversion using Co (Cat. 13) was up to 5.0% with a 0.8% absolute ethyl propyl ether selectivity and a 95.2% direct ethyl propyl ether selectivity. The conversion using Rh (Cat. 14) was up to 9.8% with a 2.8% absolute ethyl propyl ether selectivity and a 99.3% direct ethyl propyl ether selectivity. No evidence of ester direct hydrogenation took place using Fe (Cat. 15) and Mn (Cat. 16) as the metallic components on the N$_2$O$_5$ carrier.

In Comp. Ex. L-Comp. Ex. R, Re was used as the metallic component with various oxide carriers such as γ-Al$_2$O$_3$, CeO$_2$—Al$_2$O$_3$, Al$_2$O$_3$—MgO, SiO$_2$, TiO$_2$, for Cat. 17-Cat. 23. No evidence of ester direct hydrogenation took place on the Re-based catalysts.

Part B: Liquid-Phase Ester Reduction Results

Examples 6-9 and Comparative Examples S-DD

The ether product selectivities for Inv. Ex. 6-9 and Comp. Ex. S-DD are described in Table V using catalysts Cat. 24-Cat. 39. The reaction was conducted in a liquid phase reactor using the various catalysts. The hydrogenation was carried out under the following reaction conditions: at a temperature of 503 K, a H$_2$ pressure at 4,977 kPa, and a propyl acetate pressure at 1,573 kPa. There was no dilution in each of Inv. Ex. 6-9 and Comp. Ex. S-DD.

TABLE V

Liquid-Phase Ester Reduction Selectivities

| Example No. | Cat. No. | Amount Loaded (g) | Conversion (%) | Absolute Selectivity (% Ethyl Propyl Ether) | Absolute Selectivity (% Dipropyl Ether) | Direct Ether Selectivity (%) |
|---|---|---|---|---|---|---|
| Inv. Ex. 6 | 24 | 3.550 | 1.5 | 6.0 | 0.2 | 96.8 |
| Inv. Ex. 7 | 25 | 2.088 | 1.2 | 6.4 | 0.2 | 97.0 |
| Inv. Ex. 8 | 26 | 1.980 | 2.2 | 13.0 | 2.1 | 86.1 |
| Inv. Ex. 9 | 27 | 3.960 | 3.3 | 16.1 | 2.3 | 87.5 |
| Comp. Ex. S | 28 | 3.798 | 0.06 | 1.5 | 4.4 | 25.4 |
| Comp. Ex. T | 29 | 1.001 | 0.9 | 0.9 | 30.9 | 2.8 |
| Comp. Ex. U | 30 | 1.500 | 1.3 | 2.3 | 16.6 | 12.2 |
| Comp. Ex. V | 31 | 1.500 | 0.9 | 0.8 | 0.3 | 72.7 |
| Comp. Ex. W | 32 | 4.136 | 0.3 | 1.2 | 2.2 | 35.3 |
| Comp. Ex. X | 33 | 4.036 | 0.6 | 2.9 | 0.7 | 80.6 |
| Comp. Ex. Y | 34 | 4.002 | 0.5 | 1.0 | 1.8 | 35.7 |
| Comp. Ex. Z | 35 | 2.996 | 5.3 | 0.3 | 0.2 | 60.0 |
| Comp. Ex. AA | 36 | 2.317 | 1.4 | 0.2 | 4.1 | 4.7 |
| Comp. Ex. BB | 37 | 3.052 | 0.6 | 2.7 | 1.5 | 64.3 |
| Comp. Ex. CC | 38 | 2.473 | 4.5 | 0.8 | 0.1 | 88.9 |
| Comp. Ex. DD | 39 | 3.833 | 0.9 | 1.1 | 4.6 | 19.3 |

The absolute selectivity of propyl acetate reduction for Inv. Ex. 6. was 6.0%, while the direct selectivity for ethyl propyl ether was 96.8%.

In Inv. Ex. 7, the catalyst used contained 5 wt % Pd on a $Nb_2O_5$ Carrier. The results for Inv. Ex. 7 was similar to the results for Inv. Ex. 6 under the same conditions.

In Inv. Ex. 8, the catalyst used was prepared on a $WO_3$ carrier. The reaction was conducted in a liquid phase reactor using 1 wt % $Pd/WO_3$ catalyst. The hydrogenation was carried out under the following reaction conditions: at 1,595.2 kPa $C_5H_{10}O_2$; 4,976.9 kPa 112; and 503 K. The absolute ethyl propyl ether selectivity precisely reached to 13%, and the direct ether electivity for ethyl propyl ether reached to 86.1%.

In support of Inv. Ex. 8, the selectivity for the ether product of the present invention was measured at various ester feed rates as described in Table VI. Table VI describes the conversion percentages of converting an ester to an ether product and the selectivities percentages of direct selective reduction of the ester to the desired ether product over a catalyst comprising 1% Pd supported on $Nb_2O_5$, in the liquid phase reactor. The selectivities are based on the function of conversion at the following conditions: 1,595.2 kPa $C_5H_{10}O_2$, 4,976.9 kPa $H_2$, and 503 K. The selectivity for the ether product of the present invention at various ester feed rates is described in Table VI.

TABLE VI

Conversion and Product Selectivities

| Feed Rate (mol $C_5H_8O_2$)($g_{cat}$ s)$^{-1}$ | Conversion (%) | Absolute Selectivity (% Ethyl Propyl Ether) | Direct Ether Selectivity* (%) |
|---|---|---|---|
| 4.08E−05 | 1.52 | 6.02 | 97.1 |
| 2.04E−05 | 2.49 | 4.1 | 96.2 |
| 1.22E−05 | 3.29 | 3.53 | 95.4 |

Notes for Table VI:
*Amount of ether produced directly from the ester relative to the total amount of ethers. In Table VI, for example, "Direct Ether Selectivity" = Absolute Selectivity of Ethyl Propyl Ether/(Ethyl Propyl Ether + Dipropyl Ether)*100.

In Inv. Ex. 9, Cat. 22 was prepared on $WO_3$ carrier with 5 wt % Pd loadings. The absolute ethyl propyl ether selectivity in Inv. Ex. 9 reached 16.1%, together with 2.3% absolute dipropyl ether selectivity. The direct ether selectivity for ethyl propyl ether reached 87.5%.

In Comp. Ex. S-Z, several carriers were used in Cat. 28 to Cat. 35, such as active carbon, $Al_2O_3$, $MoO_3$, $CeO_2$, $ZrO_2$, $SiO_2$ and $TiO_2$. The catalyst with the active carbon carrier shows a low ester conversion. The catalyst with the $Al_2O_3$ carrier promotes more dehydration product. None of the carriers used in Comp. Ex. S-Z surpassed both the absolute and direct ethyl propyl ether selectivities compared to the $WO_3$ or $Nb_2O_5$ carriers used in Inv. Ex. 6-9.

In Comp. Ex. AA-DD, Ni, Ru and Pt metallic components were used in Cat. 36-Cat. 39 and tested. Ni and Pt show some absolute ethyl propyl ether selectivity; however, the dipropyl ether selectivity was higher than desired for Comp. Ex. AA-DD.

Discussion of Results

Part A: Vapor-Phase Ester Reduction

Table IV shows the ester reduction product distribution at varied conversions. In the vapor phase process, the selectivities for dipropyl ether and diethyl ether approach almost zero, indicating that substantially all of the ethyl propyl ether is formed based on a direct hydrogenation reaction pathway, since the alcohol dehydration has no preference in selectivities for symmetric or unsymmetric ether. Therefore, the results of Inv. Ex. 1 suggest that Pd on $Nb_2O_5$ is able to catalyze direct hydrogenation of ester to ether.

The results of Inv. Ex. 3 indicate that the $WO_3$ carrier provides a direct hydrogenation as well.

The results of Inv. Ex. 4 and Inv. Ex. 5 show that a boehmite carrier can perform direct hydrogenation.

The results of Comp. Ex. A-D indicate that a carrier such as $TiO_2$, $CeO_2$, $ZrO_2$ and active carbon, used as a catalyst in the present invention process, are less effective in providing a direct hydrogenation route of ester to ether.

The results of Comp. Ex. E-I indicate that a monometallic transition metal such as Pt, Ni, Ru, Co and Rh, used as a catalyst in the present invention process, are able to catalyze direct hydrogenation of ester to ether, providing a direct ether selectivity >95%. However, the absolute ether selectivities are <5% from catalysts with these metallic components. These catalysts require further optimization in order to achieve high absolute ether selectivity.

The results of Comp. Ex. J-R indicate that a monometallic transition metal such as Fe, Mn and Re, used as a catalyst in the present invention process, are less effective in providing a direct hydrogenation route of ester to ether.

Part B: Liquid-Phase Ester Reduction The results of Inv. Ex. 6-9 indicate that a Pd catalyst on a $Nb_2O_5$ carrier or a $WO_3$ carrier can catalyze an ester to an ether by direct hydrogenation as similarly observed from the results in the above vapor-phase reduction process.

The results of Comp. Ex. S-Z indicate that carriers such as active carbon, $Al_2O_3$, $MoO_3$, $CeO_2$, $ZrO_2$, $SiO_2$ and $TiO_2$, used as a catalyst in the present invention process, are less effective in providing a direct hydrogenation route of an ester to an ether.

The results of Comp. Ex. AA-DD indicate that a transition metal such as Ni, Ru and Pt, used as a catalyst in the present invention process, are less effective in providing a direct hydrogenation route of an ester to an ether.

Based on the above results of the vapor phase reduction process and of the liquid phase reduction process, the processes of the present invention using a Pd catalyst on a $Nb_2O_5$ carrier or on a $WO_3$ carrier can advantageously provide direct hydrogenation of an ester to an ether.

What is claimed is:

1. A process for producing an ether product by direct selective reduction of an ester comprising treating (a) at least one ester with (b) hydrogen and in the presence of (c) a heterogeneous catalyst to directly and selectively reduce the at least one ester by hydrogenation to form the at least one ether;

wherein the heterogeneous catalyst comprises a transition metal selected from at least one of palladium, platinum, and nickel, the transition metal supported on a carrier member selected from at least one of a niobium oxide carrier, a tungsten oxide carrier, and a boehmite carrier; and wherein the ether product absolute selectivity is greater than 5 percent while the direct ether product selectivity is greater than 85 percent.

2. The process of claim 1, wherein the ester is an ester containing straight or branched-chain alkyl groups; cyclic or non-cyclic alkyl groups; and mixtures thereof.

3. The process of claim 1, wherein the temperature of the process is from 350 K to 650 K; and wherein the pressure of the process is from 0.1 MPa to 10 MPa.

4. The process of claim 1, wherein the conversion of the ester is from 1 percent to 70 percent and the absolute selectivity of the ether product is from 5 percent to 20 percent.

5. The process of claim 1, wherein the ether is an unsymmetrical ether.

6. The process of claim 1, wherein the process is a vapor-phase reduction process carried out under vapor-phase process conditions.

7. The process of claim 1, wherein the process is a liquid-phase reduction process carried out under liquid-phase process conditions.

8. The process of claim 1, wherein the heterogeneous catalyst comprises a transition metal at a percent by weight (wt %) of 0.1 wt % to 20 wt %.

* * * * *